United States Patent [19]

Rohrer

[11] Patent Number: 4,510,615
[45] Date of Patent: Apr. 9, 1985

[54] MAGNETIC CHARACTER READER WITH DOUBLE DOCUMENT DETECTION

[75] Inventor: Gene D. Rohrer, Concord, N.C.

[73] Assignee: International Business Machines Corporation, Armonk, N.Y.

[21] Appl. No.: 335,482

[22] Filed: Dec. 29, 1981

[51] Int. Cl.³ .................. G06K 9/00; G06K 13/067; B07C 5/344
[52] U.S. Cl. .................. 382/7; 209/567
[58] Field of Search .......... 382/7, 29, 64, 57; 209/562, 567, 569, 568; 340/677; 364/478; 371/57; 250/223 R; 328/146; 271/279, 265; 377/53

[56] References Cited

U.S. PATENT DOCUMENTS

| | | | |
|---|---|---|---|
| 3,140,466 | 7/1964 | Greanias et al. | 382/20 |
| 3,629,822 | 12/1971 | Johnson | 340/146.3 C |
| 3,629,829 | 12/1971 | Ordower | 382/7 |
| 3,645,392 | 2/1972 | Chittenden et al. | 209/74 M |
| 3,873,843 | 3/1975 | Martin | 328/146 |
| 4,237,378 | 10/1980 | Jones | 250/223 R |
| 4,243,983 | 1/1981 | Vyas | 340/674 |
| 4,245,211 | 1/1981 | Kao | 382/7 |
| 4,299,325 | 11/1981 | Quinton et al. | 271/279 |
| 4,358,016 | 11/1982 | Richardson et al. | 209/569 |
| 4,397,460 | 8/1983 | Milanes et al. | 250/223 R |

FOREIGN PATENT DOCUMENTS 0024156 2/1981 European Pat. Off. .
2544516 4/1977 Fed. Rep. of Germany .

Primary Examiner—Michael A. Masinick
Assistant Examiner—Michael D. Parker
Attorney, Agent, or Firm—E. Ronald Coffman

[57] ABSTRACT

A multi-gap magnetic character reader is provided with the ability to automatically detect double documents. Where only weak signals are sensed, all signals are combined and compared to a reference. Where the weak signals are due to a piggyback document, the combined signals will be large with respect to the reference. Multiple documents thus detected are directed to a special reject bin.

10 Claims, 3 Drawing Figures

MAGNETIC CHARACTER READER WITH DOUBLE DOCUMENT DETECTION

BACKGROUND OF THE INVENTION

High speed document processing equipment, such as that used to process checks and other financial documents, automatically reads data from the documents, performs financial transactions, updates or records the documents and the transactions, and sorts the documents for storage or physical transport. Magnetic ink character readers have been particularly effective in such equipment. The magnetized characters are easily differentiated from the variety of other printed matter appearing on such documents. The use of highly stylized characters further accentuates the uniqueness of the magnetic ink characters.

In such equipment it is essential that each document be individually processed. Automatic separators, even working at very high efficiency will occasionally pass two or more superimposed documents. Multiple document detectors are employed to ensure that automatic processing is performed on single documents.

PRIOR ART

Magnetic ink character readers of the type having a single sensing gap or transducer conveniently provide inherent double document protection. The single gap reader employs a relatively simple technique wherein the magnetic characters are entirely magnetized with D.C. flux. A relatively large magnetic transducer covering the entire character height, traverses a series of characters to produce a characteristic time varying analog electrical response that can be processed by character recognition circuitry to identify the characters. An example of such a reader is the IBM 1255 Document Processor. The flux produced by the relatively large area of the characters is of sufficient strength, even some significant distance from the surface of the characters, to be detected by the transducer. Thus two or more superimposed documents will produce a flux pattern that is a composite of the flux from each of the documents. This composite flux is unrecognizable by the recognition logic, and the superimposed documents that produce it thus are directed to a reject pocket where they can be given individual attention.

An alternative to readers having a single gap are those multi-gap magnetic character readers which produce superior recognition reliability, but which lack inherent double document detection. Magnetic ink characters presented to a multi-gap read head are magnetized by a periodic or A.C. flux so as to present a plurality of relatively small magnetized regions to a linear array of magnetic read gaps or transducers. The output from these transducers characterize a matrix of points, enabling more sophisticated recognition logic to produce the superior results. The relatively small magnetized regions, however, produce relatively weak flux fields. The multi-gap head treats the weak flux from an underlying document as noise to be ignored. In this way, the multi-gap head avoids being confused by a composite signal. To avoid multiple document problems, separate double document detecting systems are employed. The IBM 3890 high speed document processor is an example of a multi-gap read head recognition system which employs a reliable but relatively expensive pneumatic device for double document detection.

DISCLOSURE OF THE INVENTION

The object of my invention is to provide circuitry in conjunction with a multi-gap read head, capable of processing the signals collected by the multi-gap read head in such a way that the presence of multiple documents can be detected without the required use of separate double document detecting equipment.

My invention is accomplished through the use of circuitry that sums the signal response of all read gaps and compares this sum to the response received by a small portion of the read gaps to determine whether, when measurable flux is present, the total output of all transducers is less than that which could be expected from a normal character of a single document. This condition indicates that the output signals come from flux on a superimposed document. In the preferred embodiment of my invention, the comparison is performed through the use of a non-linear function generator that segregates the high signal level generated by primary documents from the relatively weak signal generated by a superimposed or piggy-back document. The weak signal is scaled to a value that is comparable to the highest single flux signal simultaneously read by one of the gaps of the read head. Where the scaled summed signal is greater than the signal from a single gap, the flux must result from an underlying magnetic character, rather than from noise, such as a spot of ink on a primary document. Accordingly, the document is determined to be a multiple document and the equipment can thus be controlled to direct that document to a reject pocket. Because my invention does not rely upon the inherent confusion of the reading mechanism, but upon direct detection of double documents, it is possible to provide a special reject pocket for double documents that is separate from the usual reject pocket for other problem documents such as those having poorly executed or mutilated characters. Such segregation of documents facilitates the further manual processing of the rejected documents.

Those skilled in the art will recognize these and other objects, features and advantages of my invention from the following, more specific description of a preferred illustrative embodiment wherein reference is made to the accompanying drawings, of which FIG. 1 is a schematic drawing of the primary components of a document processing system, employing magnetic ink character recognition apparatus, constructed in accordance with my invention.

Figure 1:
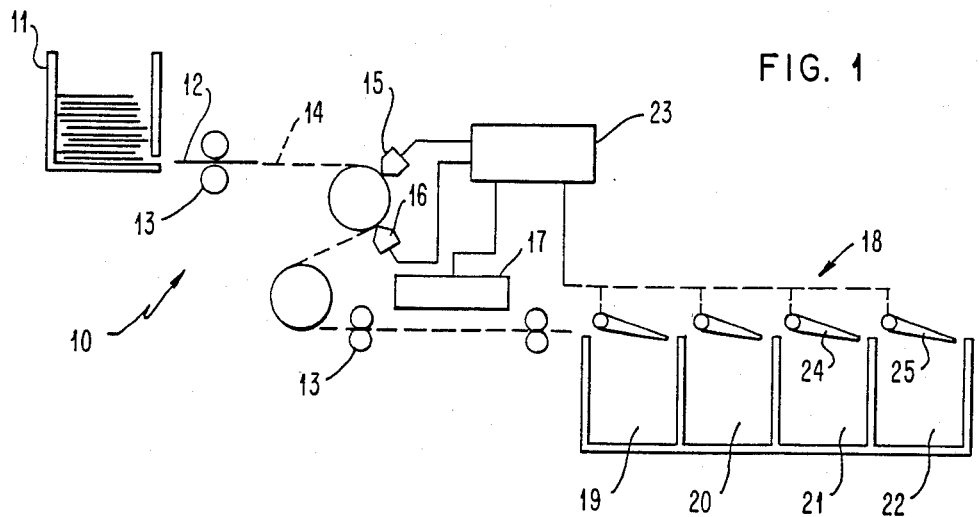

The magnetic ink character recognition apparatus 10 shown in FIG. 1, employs a document supply hopper 11 that delivers documents 12 individually to a transport 13 defining a feed path 14. Documents 12 are transported past a magnetizing station or write head 15, a read station having a multi-gap read head 16, additional operating stations indicated generally at 17, and to a multi-pocket sorter 18 having a number of pockets 19, 20, 21 and 22. Control circuitry 23 is connected to the various operating elements to provide recognition-sorting-recording functions as is well known in the art. The control circuitry 23 of my invention includes portions shown more particularly in FIGS. 2 and 3 that function in response to two or more superimposed documents 12 passing the read head 16 to control deflector 24 of sorter 18 to divert the superimposed documents into multiple document bin 21. Circuitry 23 also responds to the inability to recognize characters sensed by head 16 to control deflector 25 to divert documents bearing such unrecognizable characters into character reject bin 22.

Figure 2:
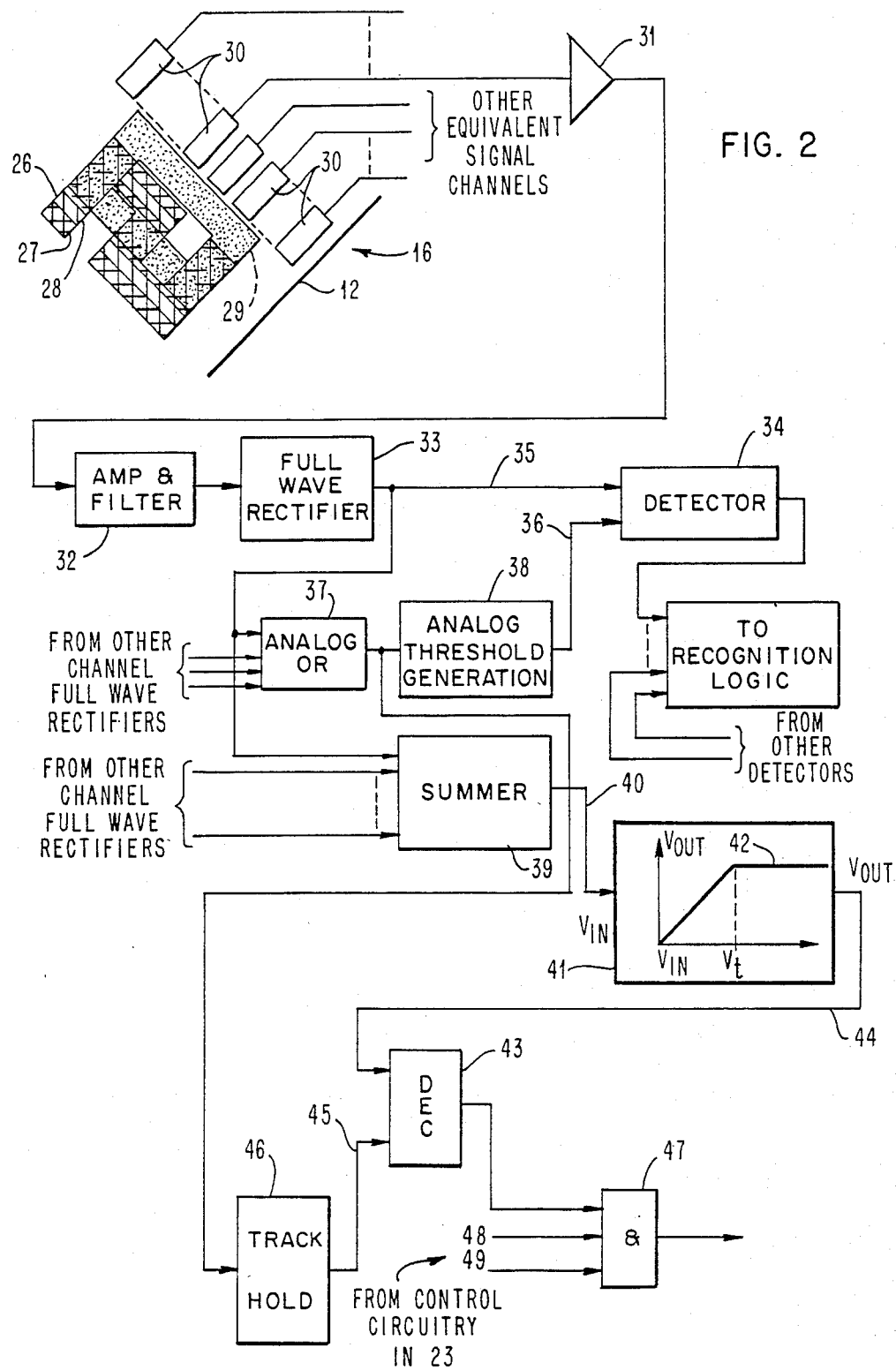
FIG. 2 is a block circuit diagram showing the principal components of a multi-gap magnetic character read head together with the components added by my invention to provide double document detection.

FIG. 2 shows a fragment of document 12, having a magnetic ink character 26 that has already been magnetized and is moving toward multi-gap read head 16 for recognition as is known in the prior art. The pattern of magnetization of character 26 consists of relatively narrow magnetized bars 27 and 28 that extend transversely of the head 16 and are of alternate polarity. This magnetic pattern is produced by applying an A.C. magnetizing field to the write head 15 as the document 12 passes.

A hidden image 29 is shown in FIG. 2 representing a magnetic character on a document that is superimposed or riding piggy-back on the document bearing character 26. The image 29 will virtually always be somewhat out of registration with character 26 so that flux from some portion of character 29 is not masked by the primary character 26.

As is known in the art, each of a plurality of transducers or magnetic sensors 30 of the head 16 produces an independent read signal in response to the particular portion of the character 26 it traverses. This signal is processed by preamplifier 31, an amplifier and filter 32, a full wave rectifier 33, and is delivered to a binary detector 34, the output of which goes to the recognition logic as known in the art. Detector 34 determines whether the signal represents character image or background data by comparing the signal level on line 35 with a threshold value on line 36 that is a function of the highest level signal produced by any of the full wave rectifiers 33 from the entire set of transducers 30. This highest value is selected by an analog OR circuit 37 and is proportioned to a level suitable for comparison by threshold generation circuit 38. The recognition circuitry, not shown, thus responds to the patterns of image data detected as the character is traversed by the group of transducers 30 to match standard patterns and thereby identify the character from a limited character set.

My invention uses these signals which have been produced for recognition purposes to detect the presence of extraneous flux as an indication that more than one document is moving past read head 16. In my invention, the output from each individual full wave rectifier 33 is connected to an analog summing circuit 39 to produce a cumulative signal output on line 40 representing the total amount of magnetic flux sensed by the linear array. This signal is modified by a non-linear operator 41 which produces an output in accordance with the profile of curve 42 for input to a comparison circuit or detector 43 via line 44. Operator 41 limits the strong signals produced by primary characters, such as 26. A second or reference signal input supplied via line 45 to detector 43 is derived from the maximum sensed individual signal which is the output of analog OR circuit 37, as tracked and held by circuit 46. The output of circuit 46 closely follows increasing input signals and decays at a constant rate in response to decreasing input signals.

Detector 43 thus compares a non-linear function of the total output of transducers 30 with the output of the highest signal produced by one of the transducers 30. Detector 43 recognizes the signal from OR circuit 37 as being larger than the output of operator 41 for such strong signals. Weak signals ($V_{in} < V_t$) emerge from operator 41 proportional to the input signal Vin. If the input signal Vin was produced by a character 29 on a piggy-back document, the output of operator 41 will be large with respect to the output of OR circuit 37.

The output from detector 43 is, in turn, used to control the further operations on the document where double documents have been detected, as for example, by selecting the multiple document bin 21. The equipment operator is thus aided since all documents in bin 21 were rejected simply as double feeds. These documents can be manually separated before being submitted for reprocessing. The output of detector 43 is delivered through an AND circuit 47 which is controlled by lines 48 and 49 which respectively indicate that a document is being processed and that the read head 16 is not passing a region of the document that has no magnetic characters thereon. AND circuit 47 thus prevents the output of detector 43 from supplying reject signals for the control of other operations such as bin selection when double documents cannot be detected.

Figure 3:
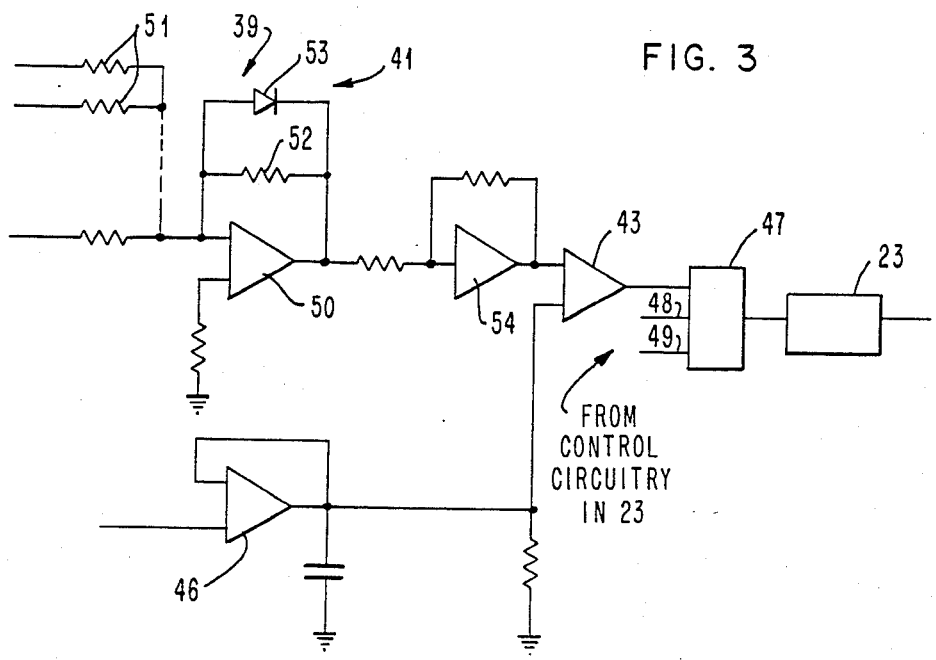
FIG. 3 is a circuit diagram showing in greater detail the circuitry that provides the double document detection function of my invention.

FIG. 3 shows, in schematic form, the particular circuitry employed in accordance with my invention. The summing circuit 39 is implemented by an operational amplifier 50 having a pluraliy of parallel input lines containing resistors 51 of equal impedance. The resistors 51 together with a bridging resistor 52 cause amplifier 50 to produce an output proportional to the sum of its input signals. An output voltage limiting diode 53 provides the function of operator 41 by limiting the proportional range of operational amplifier 50. Amplifier 54 simply adjusts the level of the signal supplied to detector 43.

While the preferred embodiment of my invention compares the sum of all transducer outputs to a single selected transducer output, the principles of my invention can be implemented with circuitry utilizing less than all transducers for the sum and more than one transducer as a reference. The choice of particular technique depends upon the other circuitry available for recognition or other functions. Those skilled in the art will recognize that the function of the non-linear signal modifier 41 could as well be applied to the reference level signal on line 45 by reversing its logical significance.

I claim:

1. Magnetic ink character recognition apparatus including a transport for moving documents bearing magnetic ink characters along a path successively past a character magnetizing station and a read station, said read station comprising a plurality of magnetic sensors arranged to encounter flux from different portions of characters borne by documents transported along said path, and wherein the improvement comprises:

first circuit means for producing a reference signal as a function of the output of a small portion of said magnetic sensors, second circuit means for producing a cumulative signal that is porportional to the sum of the output of a large portion of said magnetic sensors when said sum is relatively small, and comparison means responsive to a predetermined relationship between said reference and cumulative signals for indicating a multi-document error condition whenever said predetermined relationship exists.

2. Apparatus as defined in claim 1 wherein said first circuit means comprise an analog OR circuit producing an output that is essentially a function of the greatest single response from said plurality of magnetic sensors.

3. Apparatus as defined in claim 1 wherein said second circuit means comprises an analog adder circuit for combining the signal magnitudes from substantially all said magnetic sensors.

4. Apparatus as defined in claim 1 wherein said second circuit means comprises non-linear signal modifying means operative to limit the range of proportionality of said cumulative signal.

5. Apparatus as defined in claim 1 wherein said second circuit comprises an operational amplifier having a plurality of parallel substantially equal impedance inputs each connected to a respective one of said magnetic sensors, a bridging impedance equal to the input impedances, and an output limiting diode in parallel with said bridging impedance.

6. In combination with apparatus as defined in claim 1, document sorting means controlled by said recognition apparatus and including a plurality of document receiving bins together with controllable means for directing documents to selected ones of said bins, and wherein the improvement further comprises, first and second reject bins, means responsive to said recognition apparatus being unable to classify characters sensed for directing documents bearing such characters to the first of said reject bins, means responsive to said multi-document error condition for directing documents producing such condition to the second of said reject bins.

7. Magnetic ink character recognition apparatus including a transport for moving documents bearing magnetic ink characters along a path successively past a character magnetizing station and a read station, said read station comprising a plurality of magnetic sensors arranged to encounter flux from different portions of characters borne by documents transported along said path, and wherein the improvement comprises:

means for producing a reference signal as a function of the output of a small portion of said magnetic sensors, means for producing a cumulative signal as a function of the sum of the output of a large portion of said magnetic sensors non-linear signal modifying means operative on the signal produced by at least one of said signal producing means to distort the signal produced in a preselected range, and comparison means responsive to a predetermined relationship between said reference and cumulative signals for indicating a multi-document error condition whenever said predetermined relationship exists.

8. Apparatus as defined in claim 7 wherein said reference signal producing means comprises an analog OR circuit producing an output that is essentially a function of the greatest single response from said plurality of magnetic sensors.

9. Apparatus as defined in claim 7 wherein said cumulative signal producing means comprises an analog adder circuit for combining the signal magnitudes from all said magnetic sensors.

10. Apparatus as defined in claim 7 wherein said cumulative signal producing means comprises an operational amplifier having a plurality of parallel substantially equal impedance inputs each connected to a respective one of said magnetic sensors, a bridging impedance equal to the input impedances, and said non-linear signal modifying means comprises an output limiting diode in parallel with said bridging impedance.

* * * * *